United States Patent
Orr

(10) Patent No.: US 10,360,816 B2
(45) Date of Patent: Jul. 23, 2019

(54) SYSTEM AND METHOD FOR SIMULATING FETAL HEART RATE FOR NONINVASIVE INTRA-PARTUM FETAL MONITORING

(71) Applicant: Dynasthetics, LLC, Salt Lake City, UT (US)

(72) Inventor: Joseph Orr, Salt Lake City, UT (US)

(73) Assignee: Dynasthetics, LLC, Salt Lake City, UT (US)

( * ) Notice: Subject to any disclaimer, the term of this patent is extended or adjusted under 35 U.S.C. 154(b) by 55 days.

(21) Appl. No.: 15/257,501

(22) Filed: Sep. 6, 2016

(65) Prior Publication Data

US 2018/0068591 A1   Mar. 8, 2018

(51) Int. Cl.
  *G09B 23/32*  (2006.01)
  *G09B 23/30*  (2006.01)

(52) U.S. Cl.
  CPC ................ *G09B 23/303* (2013.01)

(58) Field of Classification Search
  CPC .............. G09B 23/32; G09B 23/281
  USPC ........................................ 434/273
  See application file for complete search history.

(56) References Cited

U.S. PATENT DOCUMENTS

| | | | |
|---|---|---|---|
| 3,599,628 A | 8/1971 | Abbenante et al. | |
| 3,797,130 A | 3/1974 | Knapp | |
| 3,822,486 A | 7/1974 | Knapp et al. | |
| 3,906,937 A | 9/1975 | Aronson | |
| 4,133,616 A | 1/1979 | Poirier et al. | |
| 4,240,409 A | 12/1980 | Robinson et al. | |
| 4,989,615 A * | 2/1991 | Hochberg | A61B 5/4356 600/587 |
| 5,184,619 A * | 2/1993 | Austin | A61B 5/035 600/376 |
| 5,224,490 A | 7/1993 | Allen et al. | |
| 5,289,827 A | 3/1994 | Orkin et al. | |
| 5,377,673 A * | 1/1995 | Van Dell | A61B 5/035 600/310 |
| 5,871,499 A * | 2/1999 | Hahn | A61B 17/42 600/588 |
| 5,879,293 A | 3/1999 | Hojaiban et al. | |
| 6,231,524 B1 | 5/2001 | Wallace et al. | |
| 6,440,089 B1 | 8/2002 | Shine | |
| 6,503,087 B1* | 1/2003 | Eggert | G09B 23/28 434/262 |
| 6,751,498 B1 | 6/2004 | Greenberg et al. | |
| 7,226,420 B2 | 6/2007 | Machit et al. | |
| 2002/0173735 A1 | 11/2002 | Lewis | |
| 2003/0153832 A1* | 8/2003 | Zumeris | A61B 5/033 600/437 |

(Continued)

*Primary Examiner* — David L Lewis
*Assistant Examiner* — Shauna-Kay Hall
(74) *Attorney, Agent, or Firm* — Durham Jones & Pinegar; Sarah W. Matthews; Christopher Wright

(57) ABSTRACT

A method and apparatus to simulate a fetal heart rate to train clinicians in using a Doppler probe. The apparatus includes an enclosure housing a bladder, with a piece of deformable material to be placed in contact with the bladder and the Doppler probe. The bladder is selectively pressurized by a source of compressed gas, the flow being controlled by a flow valve. A pressure release valve is provided to reduce pressure in the bladder. A pressure sensor monitors the bladder pressure. The flow valve may be controlled by a software run on a processor to achieve pre-determined bladder pressures to mimic a fetal heart rate.

22 Claims, 4 Drawing Sheets

(56) References Cited

U.S. PATENT DOCUMENTS

| | | |
|---|---|---|
| 2005/0131307 A1 | 6/2005 | Ruiter et al. |
| 2007/0088239 A1 | 4/2007 | Roth et al. |
| 2008/0138780 A1* | 6/2008 | Eggert .................. G09B 23/28 434/266 |
| 2009/0005690 A1* | 1/2009 | Irland .................. A61B 8/4227 600/472 |
| 2009/0011394 A1 | 1/2009 | Meglan et al. |
| 2009/0148822 A1* | 6/2009 | Eggert ................. G09B 23/281 434/271 |
| 2010/0168596 A1* | 7/2010 | Jaeschke ............ A61B 5/02411 600/511 |
| 2012/0232398 A1* | 9/2012 | Roham ................ A61B 8/0866 600/453 |
| 2013/0289456 A1 | 10/2013 | Chang Guo et al. |
| 2014/0316314 A1 | 10/2014 | Schubert |
| 2016/0361224 A1 | 12/2016 | Ramakrishna et al. |

* cited by examiner

SYSTEM AND METHOD FOR SIMULATING FETAL HEART RATE FOR NONINVASIVE INTRA-PARTUM FETAL MONITORING

FIELD OF INVENTION

This invention relates generally to fetal monitoring simulation systems and methods. It is particularly directed to a system and method for simulating a fetal heart rate to train clinicians in the use of Doppler ultrasound techniques.

BACKGROUND

Noninvasive intra-partum, or electronic fetal monitoring (EFM), is a generally accepted standard of care in obstetrics. EFM provides a visual continuous beat-to-beat recording of the fetal heart rate and a recording of uterine activity. EFM shows how the fetus responds before, during, and after each contraction and provides a graphic record for review. The goal of electronic fetal monitoring is to assist in identifying possible problems of the fetus in order to reduce or relieve that distress. The device used for EFM is a cardiotocograph, and it usually consists of two sensors placed on the mother's abdomen and held in place with a strap or belt. One sensor, the tocodynamometer (TOCO) sensor, is a pressure-sensitive contraction transducer, and measures the intensity and duration of uterine contractions during labor. The other sensor measures fetal heart rate using Doppler ultrasound to detect motion of the fetal heart valves. An example of a monitor that utilizes these sensors is the Avalon fm20 manufactured by Philips (Philips Medical, Andover Mass.).

Fetal heart rate can be measured using a Doppler ultrasound probe placed on the mother's abdomen. Alternatively, the fetal heart rate can be measured using the fetal ECG using an electrode needle attached to the fetal scalp. The Doppler ultrasound method is more common and is less invasive. Fetal heart rate (FHR) Doppler ultrasound probes measure the change in frequency of ultrasonic waves as they reflect off of moving tissues within the body. Ultrasonic waves are transmitted by piezoelectric generators in the FHR probe and the reflected waves are detected by transducers in the same probe. According to the Doppler Effect, the frequency of the reflected waves is shifted higher or lower (depending on the direction of the movement) when the waves reflect off of a moving object within the body. The shift in reflected wave frequency creates a signal that is proportional to the movement and the beat-to-beat changes in this frequency signal are analyzed to calculate the fetal heart rate. Since this method uses ultrasound, the probe must be directly coupled such that there is no air between the probe and the skin. A coupling gel is used between the probe and the skin to allow the ultrasonic energy to pass from the probe to the skin. The FHR is plotted over time and clinicians are trained to interpret the FHR for any stresses placed on the unborn infant.

Clinicians commonly train for obstetrical procedures, such as EFM, using simulation. EFM is a key part of clinicians' training. In most training systems, the electronic fetal monitoring is simulated using a computer screen that is programmed to look like an EFM plot, rather than using an actual EFM monitor. Thus, clinicians are not able to practice using the EFM monitors that they will use on patients. Clinicians are not able to practice placement of the sensors, or any use of the actual device.

Consequently, there is a long felt need for a technology that could more accurately simulate the clinical experience of using EFM. For example, if the EFM signals could be physically simulated so that simulated uterine activity and fetal heart rate data could be presented on actual EFM devices, the realism of the simulation-based training would be improved and the clinicians in training would be able to learn to better interact with actual clinical monitors and devices during simulated crisis situations.

SUMMARY

This present disclosure relates to apparatuses, methods, and systems for training clinicians in the application of EFM. The apparatus may simulate the physical properties that are measured by an EFM device. Using this invention, the realism and utility of simulation based training for obstetrical procedures can be improved by using actual patient monitors. In one aspect, the apparatus includes: an enclosure having an opening therethrough; a bladder configured to be housed in the enclosure; a piece of deformable material sized to be at least partly housed in the enclosure; the bladder in fluid communication with a pressure release valve and a flow valve.

According to one configuration, the bladder is connected to a length of tubing. The device may further comprise a pressure sensor in fluid communication with the pressure release valve and the flow valve. The flow valve may be, for example, a solenoid valve. The enclosure may have a hole, the device having a length of tubing connected to the bladder, the length of tubing passing through the hole, and the flow valve external to the enclosure. In some configurations, the device may further comprise a Doppler probe, the Doppler probe placed over the opening of the enclosure and in contact with the piece of deformable material.

According to another aspect, the device may include a processor, and wherein the processor is in communication with the solenoid valve and the pressure sensor. The processor may be programmed with software to open and close the solenoid valve at a pre-determined rate to achieve one or more pre-determined pressures at the pressure sensor. For example, the software on the processor may be programmed to open and close the solenoid valve to mimic one or more fetal heart beats.

In one configuration, the flow valve is a digital flow valve, and further comprising a processor and a pressure sensor, and wherein the processor is in communication with the digital flow valve and the pressure sensor. There may be software on the processor programmed to open and close the digital flow valve to achieve one or more pre-programmed pressures at the pressure sensor.

According to another aspect, a device is disclosed for training clinicians in the use of Doppler probes, the device comprising: a frame, the frame having an opening on a top surface and a second opening on a lateral side; a bladder housed in the frame, the bladder connected to a first end of a length of tubing, the first end of the length of tubing passing through the second opening on the lateral side of the frame; a piece of deformable material in contact with the bladder and extending through the opening of the frame; the length of tubing having a pressure release valve proximal to the first end, a pressure sensor, and a flow valve; wherein the second end of the length of tubing is connectable to a source of compressed gas.

The flow valve may be one of a variable flow valve, a digital flow valve, a solenoid valve, a piezoelectric valve, and a fill and dump valve. In some configurations, the device may further comprise a processor in communication with the flow valve and the pressure sensor. The processor may have software programmed thereon to open and close the flow valve to achieve one or more pre-programmed pressures at the pressure sensor.

According to yet another aspect, a device for simulating a fetal heartbeat is described, the device comprising: an enclosure having an opening therethrough; an electro-mechanical device configured to simulate a fetal heartbeat housed in the enclosure; a piece of deformable material housed in the enclosure between the opening and the electro-mechanical device; and a processor in communication with the electro-mechanical device. The electro-mechanical device may include one of a stepper motor, a gear motor, and a linear solenoid. There may be software on the processor programmed to actuate the electro-mechanical device at a pre-determined rate to mimic one or more fetal heart beats.

According to yet another aspect, a method is described for training clinicians in the use of Doppler probes, the method comprising: selecting a device designed to mimic uterine contractions, the device comprising: an enclosure, the enclosure having an opening on a top surface and a second opening on a side; a bladder housed in the enclosure, the bladder connected to a first end of a length of tubing, the first end of the length of tubing passing through the second opening on the lateral side of the enclosure; a piece of deformable material in contact with the bladder and extending through the opening of the enclosure; the length of tubing having a pressure release valve proximal to the first end, a pressure sensor, and a flow valve; connecting the second end of the length of tubing to a source of compressed gas; connecting a Doppler probe to the enclosure, and placing the Doppler probe in contact with the piece of deformable material.

According to another aspect, a kit containing a device for simulating a fetal heartbeat may include an enclosure having an opening therethrough; a bladder configured to be housed in the enclosure; a piece of deformable material configured to be at least partly housed in the enclosure; a length of tubing configured to be connected to the bladder, the length of tubing having a pressure release valve and a flow valve.

In another configuration, a device for simulating a fetal heartbeat may comprise an enclosure having an opening therethrough; a bladder configured to be fit within in the enclosure; a piece of deformable material sized to be at least partly housed in the enclosure; the bladder in fluid communication with a pressure release valve; and wherein the bladder is configured to be connected to a constant source of pressure. The pressure release valve may be configured to release pressure at pre-determined pressure thresholds.

BRIEF DESCRIPTION OF THE DRAWINGS

The following drawings illustrate what are currently considered to be specific configurations for carrying out the invention.

DETAILED DESCRIPTION

Figure 1:
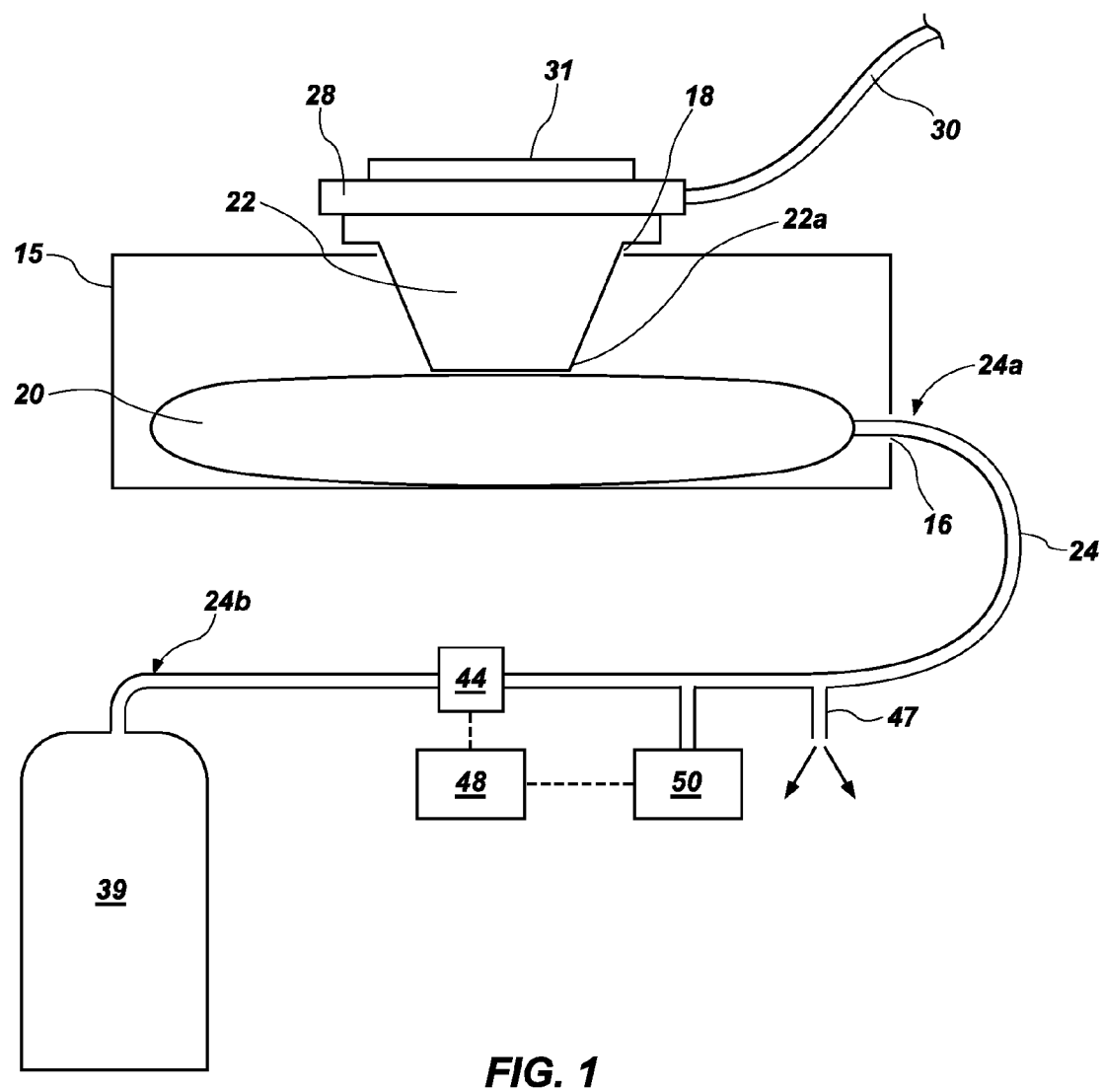
FIG. 1 is a side, cut-away view of a device that can be used to train clinicians in monitoring fetal heart rate.

Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the claims which follow.

Definitions

The term "Doppler probe" means a standard Doppler probe used to measure fetal heart rate (FHR). The Doppler includes one or more piezoelectric generators to generate ultrasound waves, and one or more transducers to detect reflected waves. Any suitable Doppler probe known in the art may be used, such as those manufactured by Siemens, Summit LifeDop, Phillips, GE medical, etc.

The term "valve" means any type of device for controlling the passage of compressed gas through the tubing. For example, a solenoid valve may be used, a digital valve, fill and dump valves, a variable flow valve, an electronically controlled proportional valve, a motor-driven valve, a piezoelectric valve, etc.

The term "pressure release valve" means a hole in the length of tubing through which gas may intentionally pass. Alternatively, "pressure release valve" may mean a valve that selectively opens to allow gas to exit the length of tubing. The pressure release valve may control when the bladder is deflated.

The term "deformable material" means a mold of soft material, such as a gel, made for example, from silicone. (For example, SS-6080 Very Soft Gel Silicone Rubber, Silicone Solutions, Cuyahoga Falls, Ohio). The deformable material may also be, for example, a bag or balloon of liquid or gel. The ultrasound waves generated by the Doppler probe may travel through the deformable material and reflect back to the Doppler probe.

The term "bladder pressure" means the pressure that is measured by the pressure sensor downstream from the flow valve, the pressure sensor being in connection with the bladder. This pressure is typically primarily caused by gas or air forced into the bladder. Bladder pressure can also be affected by the ambient pressure. Bladder pressure is used to simulate fetal heart rate by causing a movement of the bladder against the deformable material which is sensed in the reflected ultrasound waves.

The term "tubing" means tubing or any other mechanism capable of fluidly connecting two or more pneumatic components. For example, tubing as used herein comprises tubing such as plastic tubing, a pipe, a manifold, a sealed box with ports to connect various pneumatic components, etc.

The term "enclosure" means a housing, frame, casing, shell, container, or other structure capable of holding the bladder described herein in place. The enclosure may be substantially closed (such as with solid sidewalls) or may be substantially open, such as a frame. The enclosure may house or encase the bladder, and a portion of the deformable material or all of the deformable material. The enclosure may also have one or more openings to receive a Doppler and/or tubing to fluidly connect the bladder to other pneumatic elements.

The term "processor" means a standard processor, typically equipped with a control unit, a logic unit, and a register.

A side, cut-away of the apparatus for simulating fetal heart rate, generally indicated at 10, is shown in FIG. 1, with the pneumatics shown in schematic form. In clinical practice, the apparatus may be used as-is, or may be mounted on the abdominal wall of a maternal manikin. The apparatus generally consists of an enclosure 15 with an opening 18 on the top surface. A bladder 20 may be housed in the enclosure 15. A piece of deformable material 22 is placed above the bladder 20 and may extend through the opening 18 of the enclosure 15. A length of tubing 24 may be connected to the bladder 20 to deliver pressurized gas to the bladder 20. A Doppler probe 28 may be used in conjunction with the device, and may be mounted to the enclosure 15 via a retaining strap 31 or other retaining device (for example, a clamp or other fastening means). If the apparatus is connected to a maternal manikin, the strap 31 may extend around the abdomen of the manikin and the enclosure 15. If no manikin is used, the strap 31 may extend around the enclosure 15. The Doppler probe 28 may be mounted on the enclosure 15 such that the Doppler probe is in direct contact with the deformable material 22.

The enclosure 15 may be formed of any suitable material, such as plastic or another semi-rigid or rigid material. The enclosure 15 may also be any suitable shape to generally contain the bladder 20 and a portion of the deformable material 22. The enclosure, for example, may be an open frame or other suitable shape to generally contain the bladder 20 and a portion of the deformable material 22. The enclosure 15 may include an opening 18, such as an opening in the top of the enclosure. In some configurations, the enclosure 15 may have a generally open top that forms the opening 18. The opening 18 may allow the deformable material 22 to contact the bladder 20 within the enclosure 15, extend through the opening 18, and contact a Doppler probe 28. The enclosure 15 may also include an opening 16 on a lateral side 15a of the enclosure 15. The opening 16 may be used to pass the length of tubing 24 from the enclosure 15 to the source of compressed gas 39. It will be appreciated that while the pressure release valve 47, pressure sensor 50, etc. are shown outside the enclosure 15 in FIG. 1, in some configurations these structures could be housed within the enclosure 15, attached to the outside of the enclosure, etc.

The bladder 20 may be selectively filled with gas via a source of compressed gas 39 at the second end 24b of the length of tubing 24. The bladder 20 may be fluidly connected to the source of gas 39 via tubing or any other suitable mechanism, such as a pipe, a manifold, a sealed box with ports to connect various pneumatic components, etc. The bladder 20 may be pressurized at different levels to simulate different amplitudes, or intensities, of the Doppler ultrasound signal. As the bladder 20 is pressurized at different levels, the force exerted by the bladder 20 on the deformable material 22 changes.

As the Doppler probe sends ultrasound waves through the deformable material 22, the waves are reflected back at the opposite edge of the deformable material. As the force exerted by the bladder 20 on the deformable material 22 changes, the opposite edge of the deformable material 22a is deformed and the reflected ultrasound waves are altered, simulating a fetal heart rate. As the deformable material 22 is compressed, the frequency of the reflected waves changes in proportion to the movement of the deformed edge 22a. Movement of the edge 22a of the deformed material simulates a moving structure within the body and causes the Doppler probe to detect a fetal heartbeat. The rate and magnitude of the compression of the deformable material 22 determines the simulated fetal heart rate and magnitude of the Doppler ultrasound signal. Because the deformable material 22 is very soft, it may couple directly to the Doppler probe such that no coupling gel is needed between the probe and the gel.

The fetal heart rate detected by the Doppler probe 28 caused by compression of the bladder 20 against the deformable material 22 is sent to a standard fetal monitor via a cable 30 connection from the Doppler probe to the fetal monitor, which outputs a plot of the fetal heart rate readings over time.

The length of tubing 24 may connect to the bladder on a first end 24a and to a source of air or gas 39 (shown in schematics) on a second end 24b. The source of gas 39 may be, for example, a tank of compressed gas or an air compressor. The flow of gas from the source 39 is controlled by one or more valves 44. The valve 44 may allow gas to pass into the bladder 20 from the air or gas source 39. The gas also passes a pressure release valve 47 located along the length of tubing. The pressure release valve 47 allows gas to leave the bladder 20 (as indicated by the arrows) in proportion to the amount of pressure in the bladder 20. The pressure release valve 47 may be a pre-determined size, or the pressure release valve 47 may be adjustable. For example, the pressure release valve 47 may comprise a valve that is selectively opened and closed to allow air or gas to escape the bladder 20. The pressure release valve 47 may also comprise a hole of a pre-determined size.

Opening the valve 44 causes the flow of gas or air to increase through the length of tubing 24 and into bladder 20, with an expected increase in bladder pressure. Closing the valve 44 to a flow less than the flow of the pressure release valve 47 allows the pressure in the bladder to fall.

The valve 44 may be any suitable type of valve that allows control of gas flow. For example, a variable flow valve may be used, a digital flow valve such as an electronically controlled proportional valve, fill and dump valves, etc. In one configuration, the valve 44 is a solenoid valve. In some configurations, the valve 44 may be in communication with a processor 48 (indicated by dashed lines in FIG. 1) and controlled by software. The communication may be direct, or via a wireless protocol. A pressure sensor 50 may be placed along the length of tubing 24 and may also be in communication with the processor 48. The pressure sensor 50 may be used to measure the amount of pressure in the length of tubing 24 at a point upstream, or before, the pressure release valve 47, and may be used to determine the bladder pressure. In some configurations, the pressure sensor may be in communication with the processor of the valve 44 to allow the valve to open and close to achieve specific pressures at the pressure sensor 50.

The processor 48 may control the opening of valve 44 to achieve a desired pressure reading on the pressure sensor 50 for a certain pre-determined amount of time. For example, a fetal heart beat may simulated by filling the bladder 20 until a pre-set bladder pressure (as measured at the pressure sensor 50) is reached, and then allowing air to leak from the bladder 20 through the pressure release valve 47 so that the deformable material 22 regains its normal or non-compressed shape. Desired pressures may typically range between about 5 to about 40 mm Hg, depending on the hardness of the deformable material 22. For example, if a harder material is used, then the range of pressures would need to be greater.

The bladder empties constantly through the pressure release valve 47. Adjusting the pre-determined pressure limit for the pressure sensor 50 adjusts the magnitude of the compression of the deformable material 22 and therefore the amplitude of the simulated Doppler ultrasound signal. Software on the processor 48 may control the pre-determined pressure limits by controlling the opening of valve 44. The processor communicates with the valve 44 and the pressure sensor 50 to achieve the filling and draining of the bladder 20. Each fill and drain cycle may simulate a single fetal heartbeat.

Figure 2:
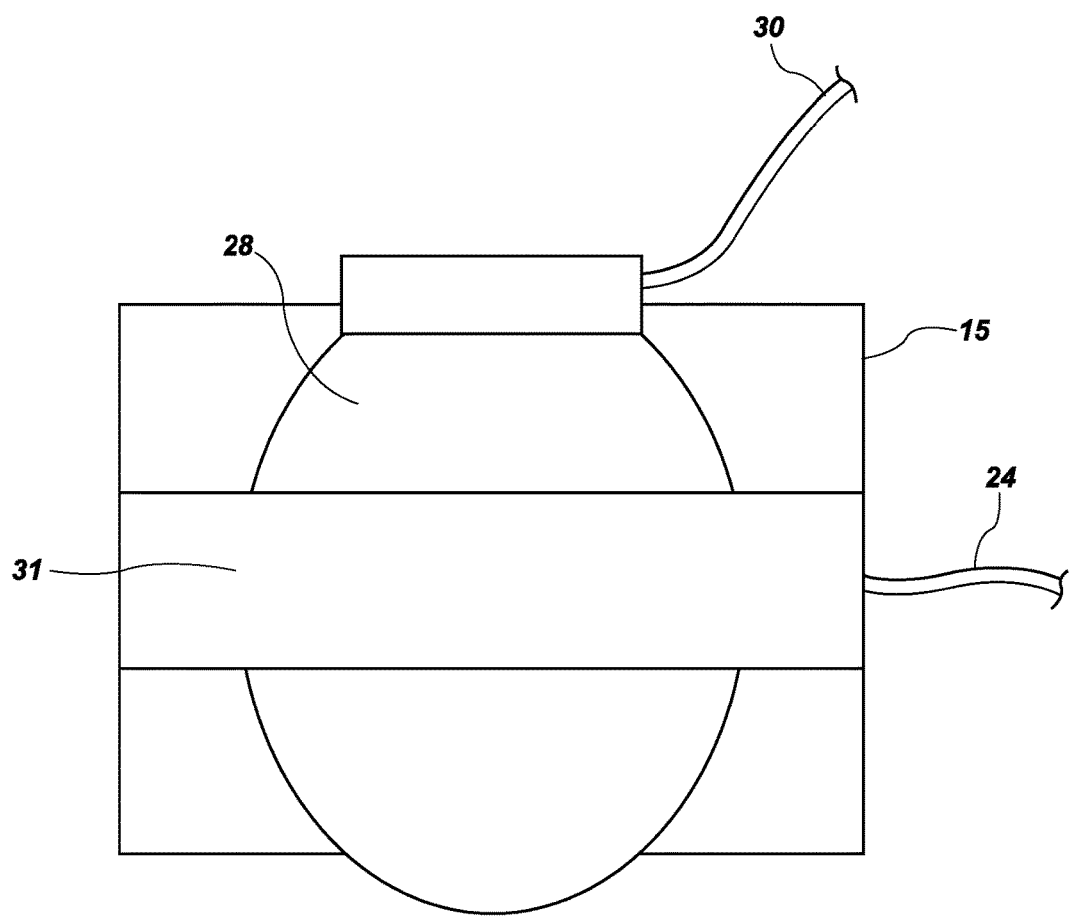
FIG. 2 is a top view of the device of FIG. 1, without the pneumatics shown.
Figure 3:
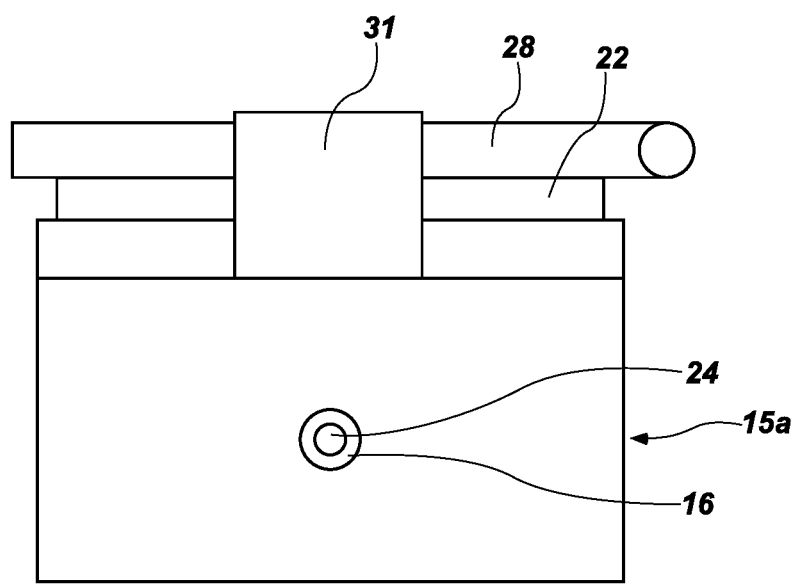
FIG. 3 is a side view of FIG. 2.

FIG. 2 shows a top view of the enclosure 15 and associated Doppler probe 28 of FIG. 1. The pneumatics are not shown for clarity. FIG. 3 shows a lateral side view of the enclosure 15 and associated Doppler probe 28 of FIG. 1. Again, the pneumatics are not shown for clarity. From this view, the opening 16 in the lateral side 15a of the enclosure 15 can be seen, with the length of tubing 24 exiting the housing from the lateral side 15a. It will be appreciated that the length of tubing 24 may be integral to the bladder 20, or it may be removably attachable to the bladder 20. Similarly, the pneumatics may be integral to the length of tubing 24 or may be removably attached to the length of tubing 24.

Computer software, consisting of executable code of machine language instructions to the processor 48 may control the bladder draining time to simulate the correct fetal heart rate. The processor 48 may be programmed to monitor the pressure in the bladder 20 via the pressure sensor 50 and to control the duration and frequency of the opening of the valve 44. The bladder 20 may be filled until a pre-set pressure (measured at pressure sensor 50) is reached so the filling time associated with each simulated heart rate is determined by the set filling pressure. The time of each individual heart beat is calculated as:

Individual beat time (in seconds)=60÷heart rate

Where "heart rate" has units of beats per minute. The filling time is measured for each individual beat by the processor 48 determining the amount of time needed to achieve the pre-set pressure at the pressure sensor 50. The system calculates the bladder emptying time as:

Bladder emptying time=(individual beat time)−measured filling time

Where individual beat time and measured filling time are in seconds. The user may adjust the pre-set bladder filling pressure depending on the desired signal volume (a higher pre-determined bladder filling pressure may give a stronger signal), probe placement on the deformable material (if the probe is placed off-center, the signal may not be as strong), retaining strap force (a tighter fitting strap may give a stronger signal), etc.

Alternatively, rather than having the system calculate the fill duration needed to achieve a specific heart rate, a pre-set fill duration may be used. With a pre-set fill duration, the pressure valve 44 could be eliminated from the system.

Figure 4:
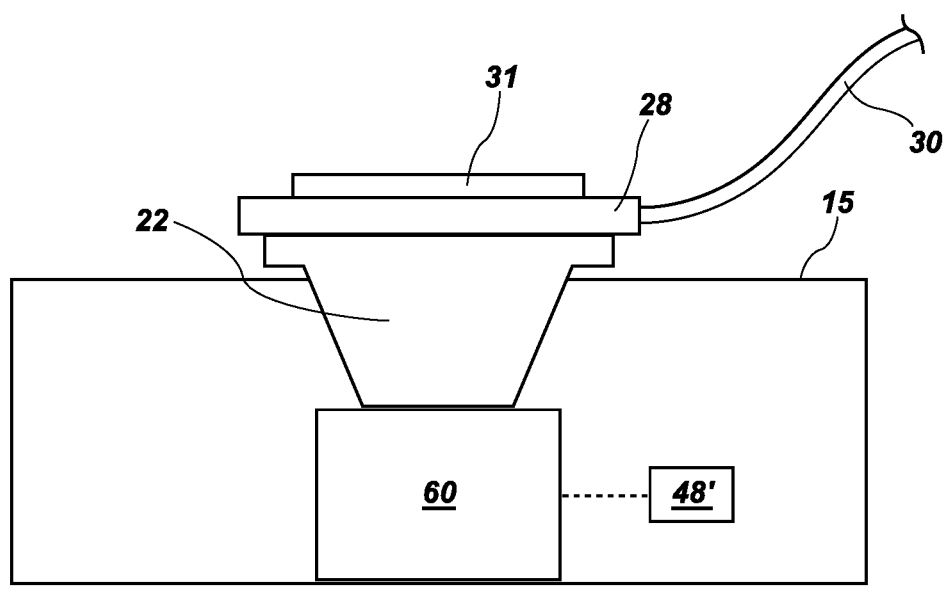
FIG. 4 is a side-cut away view of an alternate configuration of the device.

Numerous other structures may be used to simulate a fetal heart rate for clinicians to measure with a Doppler and are contemplated herein. For example, instead of using a bladder to change the shape of the deformable material, another structure could be used. Such structures include a stepper motor, a gear motor, a linear solenoid, or another electromechanical device. The bladder could also be replaced by a piston, syringe other pneumatic actuator to deform the deformable material. FIG. 4 shows a schematic view of the system using an electro-mechanical device 60 to change the shape of the deformable material. The electro-mechanical device 60 may also be in communication with a processor 48' to control the timing of actuation of the electro-mechanical device 60 to simulate a fetal heart rate. The processor 48' may be programmed to actuate the electro-mechanical device at a pre-determined rate to mimic one or more fetal heart beats.

The apparatus for simulating a fetal heart rate could be mounted on the abdominal wall of a maternal manikin such that the FHR probe could be placed on the abdomen of the manikin and be held in place using a strap placed around the abdomen of the manikin. If a simulated skin is placed over the molded gel, an ultrasonic coupling gel should be used by the clinician between the FHR probe and the simulated skin to ensure proper contact.

According to another possible configuration, the system could be pressurized at various levels using a pressure release valve that releases pressure at variable pressure thresholds. In such a configuration, the bladder 20 may be filled at a constant rate, while the variable pressure release valve empties at a variable rate to achieve a pre-determined pressure. A flow valve would not be necessary in such a configuration.

The various aspects of a device as described herein may be sold as a formed, single unit, or a kit may be provided that includes pieces of the device that may be connected later by a clinician. For example, a kit may contain a frame or enclosure, a bladder configured to fit in the frame or enclosure, a piece of deformable material, a means for fluidly connecting the bladder to a source of gas (such as a piece of tubing or manifold), a pressure release valve, and a pressure valve configured to be fluidly connected to the bladder and source of gas. In order to use the device, the clinician may place the bladder in the frame, place the piece of deformable material on top of the bladder, and connect the bladder fluidly to a source of gas and a pressure valve and pressure release valve (such as via a piece of tubing or manifold). The Doppler probe may then be placed in contact with the piece of deformable material.

While the invention has been described in particular with reference to certain illustrated configurations, such is not intended to limit the scope of the invention. The present invention may be embodied in other specific forms without departing from its spirit or essential characteristics. The described configurations are to be considered as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A device for simulating a fetal heartbeat, the device comprising:
    an enclosure having an opening therethrough;
    a bladder configured to be housed in the enclosure;
    a deformable material at least partly housed in the enclosure, the deformable material configured to allow a plurality ultrasound waves to travel through the deformable material and reflect at least some of the plurality of ultrasound waves, the deformable material positioned between the bladder and the opening of the enclosure;
    the bladder in fluid communication with a pressure release valve and a flow valve.

2. The device of claim 1, wherein the bladder is connected to a length of tubing.

3. The device of claim 1, further comprising a pressure sensor in fluid communication with the pressure release valve and the flow valve.

4. The device of claim 1, wherein the flow valve is a solenoid valve.

5. The device of claim 3, wherein the flow valve is a solenoid valve, and further comprising a processor, and wherein the processor is in communication with the solenoid valve and the pressure sensor.

6. The device of claim 5, further comprising software on the processor programmed to open and close the solenoid valve at a pre-determined rate to achieve one or more pre-determined pressures at the pressure sensor.

7. The device of claim 6, wherein the software on the processor is programmed to open and close the solenoid valve to mimic one or more fetal heart beats.

8. The device of claim 1, wherein the flow valve is a digital flow valve, and further comprising a processor and a pressure sensor, and wherein the processor is in communication with the digital flow valve and the pressure sensor.

9. The device of claim 5, further comprising software on the processor programmed pressures at the pressure sensor.

10. The device of claim 1, the enclosure further having a hole in addition to the opening, the device having a length of tubing connected to the bladder, the length of tubing passing through the hole, and the flow valve external to the enclosure.

11. The device of claim 1, further comprising a Doppler probe, the Doppler probe placed over the opening of the enclosure and in contact with the deformable material.

12. A device for training clinicians in the use of Doppler probes, the device comprising:
 a rigid frame, the rigid frame having an opening on a top surface and a second opening on a lateral side;
 a bladder housed in the rigid frame, the bladder connected to a first end of a length of tubing, the first end of the length of tubing passing through the second opening on the lateral side of the rigid frame;
 a deformable material in contact with the bladder and extending through the opening of the rigid frame, the deformable material comprising a silicone gel;
 the length of tubing having a pressure release valve proximal to the first end a pressure sensor, and a flow valve;
 wherein the second end of the length of tubing is connectable to a source of compressed gas.

13. The device of claim 12, wherein the flow valve is one of a variable flow valve, a digital flow valve, a solenoid valve, a piezoelectric valve, and a fill and dump valve.

14. The device of claim 13, further comprising a processor in communication with the flow valve and the pressure sensor.

15. The device of claim 14, further comprising software on the processor programmed to open and close the flow valve to achieve one or more pre-programmed pressures at the pressure sensor, the one or more pre-programmed pressures comprising pre-programmed pressures indicative of a fetal heart rate, where the fetal heart rate is measured in beats per minute.

16. A device for simulating a fetal heartbeat, the device comprising:
 an enclosure having an opening therethrough;
 an electro-mechanical device configured to simulate a fetal heartbeat housed in the enclosure;
 a deformable material housed in the enclosure between the opening and the electro-mechanical device; and
 a processor in communication with the electro-mechanical device.

17. The device of claim 16, further comprising software on the processor programmed to actuate the electro-mechanical device at a pre-determined rate to mimic one or more fetal heart beats.

18. A method for training clinicians in the use of Doppler probes, the method comprising:
 selecting a device designed to mimic uterine contractions, the device comprising:
 an enclosure, the enclosure having an opening on a top surface and a second opening on a side;
 a bladder housed in the enclosure, the bladder connected to a first end of a length of tubing, the first end of the length of tubing passing through the second opening on the lateral side of the enclosure;
 a deformable material in contact with the bladder and extending through the opening of the enclosure;
 the length of tubing having a pressure release valve proximal to the first end, a pressure sensor, and a flow valve;
 connecting the second end of the length of tubing to a source of compressed gas;
 connecting a Doppler probe to the enclosure, and placing the Doppler probe in contact with the deformable material.

19. A kit containing a device for simulating a fetal heartbeat, the kit comprising:
 an enclosure having an opening therethrough;
 a bladder configured to be housed in the enclosure;
 a deformable material configured to be at least partly housed in the enclosure between the bladder and the opening;
 a second opening in the enclosure, and a length of tubing configured to be connected to the bladder through the second opening, the length of tubing having a pressure release valve and a flow valve.

20. The device of claim 17, wherein the electro-mechanical device includes one of a stepper motor, a gear motor, and a linear solenoid.

21. A device for simulating a fetal heartbeat, the device comprising:
 an enclosure having an opening therethrough;
 a bladder configured to be fit within in the enclosure;
 a deformable material at least partly housed in the enclosure between the bladder and the opening;
 the bladder in fluid communication with a pressure release valve; and wherein the bladder is configured to be connected to a constant source of pressure.

22. The device of claim 21, wherein the pressure release valve is configured to release pressure at pre-determined pressure thresholds.

* * * * *